United States Patent
Westermann

(10) Patent No.: US 7,309,085 B2
(45) Date of Patent: Dec. 18, 2007

(54) THREADED PIPE COUPLING

(75) Inventor: Pirmin Westermann, Niederhasli (CH)

(73) Assignee: Kulm Holding AG, Aadorf (CH)

( * ) Notice: Subject to any disclaimer, the term of this patent is extended or adjusted under 35 U.S.C. 154(b) by 0 days.

(21) Appl. No.: 10/737,735

(22) Filed: Dec. 16, 2003

(65) Prior Publication Data

US 2004/0183303 A1   Sep. 23, 2004

(30) Foreign Application Priority Data

Dec. 21, 2002  (DE) .......................... 202 19 884 U
Mar. 19, 2003  (EP) .............................. 03006037

(51) Int. Cl.
*F16L 13/14*  (2006.01)
(52) U.S. Cl. .................. 285/382.7; 285/354
(58) Field of Classification Search ............. 285/354, 285/385, 386, 389, 4, 382.7, 341–343
See application file for complete search history.

(56) References Cited

U.S. PATENT DOCUMENTS

| | | | | |
|---|---|---|---|---|
| 2,503,826 A | * | 4/1950 | Lamont | 285/340 |
| 2,693,374 A | * | 11/1954 | Wurzburger | 285/343 |
| 2,737,403 A | * | 3/1956 | Ellis | 285/382.7 |
| 2,930,635 A | * | 3/1960 | Woodling | 285/341 |
| 2,943,871 A | * | 7/1960 | St Clair | 285/342 |
| 3,109,673 A | * | 11/1963 | Wurzburger | 285/342 |
| 3,112,131 A | * | 11/1963 | Campbell | 285/382.7 |
| 3,294,425 A | * | 12/1966 | Franck | 285/382.7 |
| 4,136,896 A | * | 1/1979 | Rodman et al. | 285/341 |
| 4,867,489 A | * | 9/1989 | Patel | 285/342 |
| 5,188,401 A | | 2/1993 | Staniforth | |
| 5,529,349 A | | 6/1996 | Anglin et al. | |
| 6,598,908 B1 | * | 7/2003 | Wosik | 285/334.5 |

* cited by examiner

*Primary Examiner*—Aaron Dunwoody
(74) *Attorney, Agent, or Firm*—Martin Fleit; Paul D. Bianco; Fleit Kain Gibbons Gutman Bongini & Bianco P.L.

(57) ABSTRACT

A threaded pipe coupling for connecting a pipe to a connection part with a conical exterior surface, especially for connecting copper pipes in refrigeration technology, with a sleeve-shaped union nut to form a threaded coupling with the connection part and a clamping ring arranged within the union nut. To enable an easy-to-realize coupling also without additional elements and without preliminary work, the clamping ring has a conical inner surface, corresponding to the conical exterior surface of the connection part, with a sealing bead coming into contact with the conical exterior surface of the connection part.

2 Claims, 2 Drawing Sheets

THREADED PIPE COUPLING

BACKGROUND OF THE INVENTION

1. Field of the Invention

The invention relates to a threaded pipe coupling for connecting a pipe to a connecting part with conical exterior surfaces, particularly for connecting copper pipes in refrigeration technology.

2. Prior Art

The connection nipples used in refrigeration technology typically have a conical exterior surface on their front, connection-side end. Previously the pipe ends were often expanded (raised edges) for sealing pipe joints at such connection nipples. The expanded part of the pipe is then directly clamped between a union nut that can be threaded onto the connection nipple and the connection nipple. Such a clamping then seals the pipe end on the connection nipple. However, one problem in such threaded couplings is that there is an increased risk of crack formation due to the expansion of the pipe and the resulting weakening of the material. With vibrations in particular, cracks and resulting non-sealed areas of the threaded coupling can be created in the expanded region. These problems occur particularly in copper pipes because copper undergoes intensive work-hardening for large deformations. Here, in addition to undesired non-sealed areas, ruptures of the pipe ends can even be produced. The discharged media are environmentally dangerous.

a. As an alternative, special transition pieces with an inner contour adapted to the shape of the connection nipple are soldered to the pipe end. These transition pieces are then likewise clamped between a union nut and the connection nipple. However, this type of connection has the disadvantage that the solder joint is susceptible to vibrations, and the connection can break at the solder joint. Typical solder is also poisonous, and represents a danger to the installer and the environment.

b. To avoid the previously mentioned problems, additional intermediate pieces have also already been used, which are initially threaded to the connection nipple. The corresponding pipe is then mounted on this separate intermediate piece by means of a threaded pipe coupling. However, this type of coupling requires additional components, which is associated with increased costs and assembly expense.

SUMMARY OF THE INVENTION

The task of the invention is to create a threaded pipe coupling of the initially mentioned type, which also enables a tight and easy-to-realize coupling between the connection part and the pipe without additional elements and without preliminary work on the pipe.

This task is solved by a threaded pipe coupling with the features to be described herein. Preferred configurations and advantageous refinements of the invention are the object of various stated inventions at the end hereof.

An essential advantage of the threaded pipe coupling according to the invention is that no preliminary processing or deformation of the pipe to be connected is required. Therefore, there is also no weakening of the pipe end or risk of resulting cracks. There is also no vulnerable solder point. Such a coupling is not susceptible to vibrations and is extremely robust against radial forces that can act on the pipe. The coupling also forms a purely metallic seal, and is thus is not susceptible to temperature fluctuations and high temperatures. Furthermore, in contrast to known configurations, no additional sealing elements are required. The clamping ring itself takes over the sealing function, so that separate sealing washers or sealing rings can be eliminated.

BRIEF DESCRIPTION OF THE DRAWINGS

Further details and advantages of the invention result from the following description of preferred embodiments, with reference to the drawing. Shown are.

DETAILED DESCRIPTION OF PREFERRED EMBODIMENTS OF THE INVENTION

Figure 1:
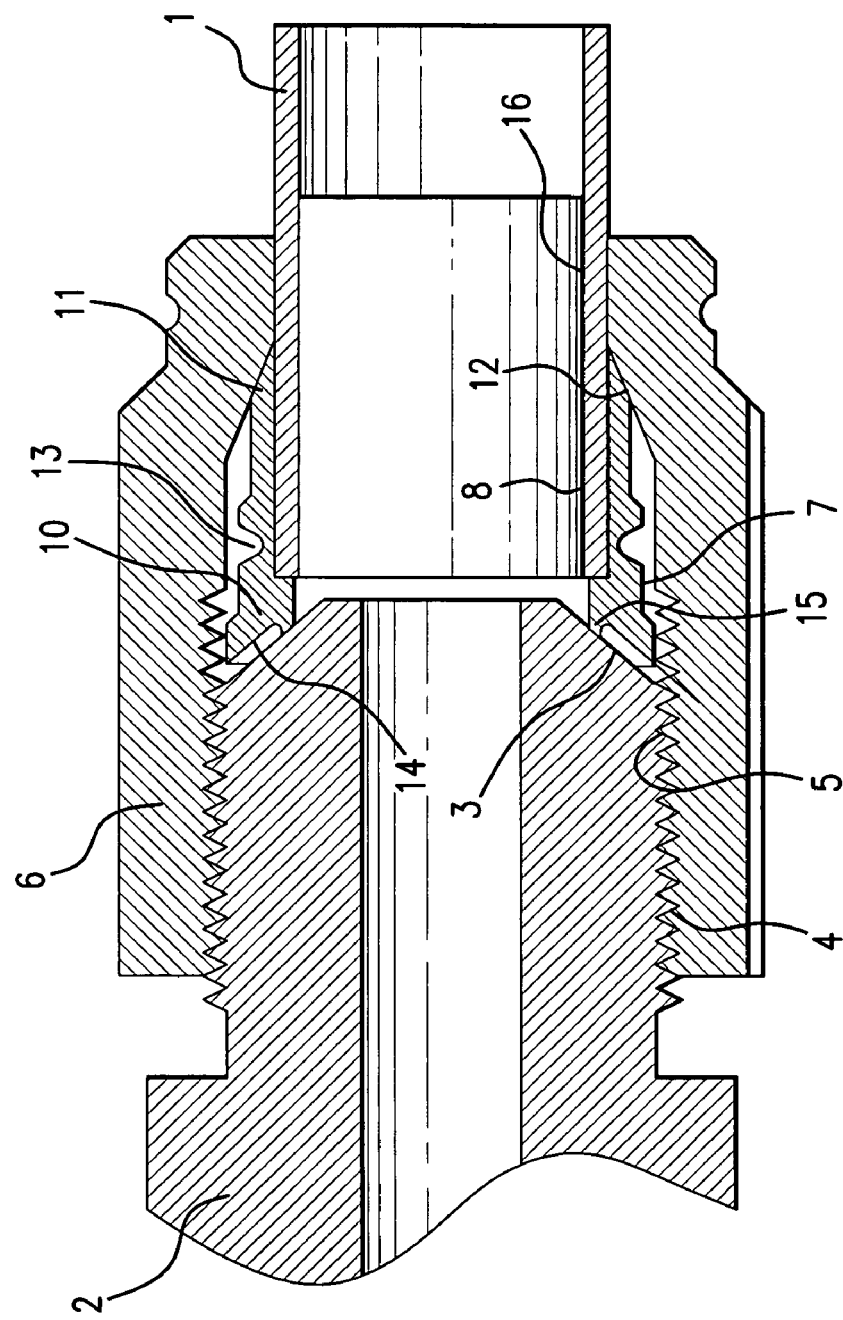
FIG. 1, a first embodiment of a threaded pipe coupling in a longitudinal section, and FIG. 2, a second embodiment of a threaded pipe coupling in a longitudinal section.

The threaded pipe coupling shown schematically in FIG. 1 is designed for connecting a pipe 1 to a connection part 2 configured in the shape of a connection nipple with a front conical exterior surface 3. The connection part 2 includes an external thread 4 onto which a sleeve-shaped union nut 6 provided with a corresponding internal thread 5 is threaded. Within the union nut 6, there is a clamped ring 7 made from metal for forming a clamping and sealed attachment the pipe 1 to the connection part 2.

The clamping ring 7 has an inner reception opening 8 matched to the diameter of the pipe 1 with a contact surface 9 for receiving the pipe end. The clamping ring 7 includes a thick contact region 10 projecting in the axial direction beyond the pipe end and a thin clamping region 11 which is arranged over the pipe end and which makes contact on its outer side with a conical inner surface 12 of the union nut 6. A V-shaped circular groove 13, which imparts a certain elasticity to the clamping ring 7 for absorbing pressure shocks and vibrations, is provided at the outer side of the clamping ring 7 between the contact region 10 and the clamping region 11. The clamping ring 7 also has on its end facing the connection part 2 a conical inner surface 14 corresponding to the conical exterior surface 3 of the connection part 2, with a sealing bead 15 that produces a sealing contact with the conical exterior surface of the connection part 2 running at 45° when the union nut is threaded on. A support sleeve 16 for stabilization is further inserted into the pipe end.

When the union nut 6 is threaded on, the clamping ring 7 with the sealing bead 15 is pressed against the front conical exterior surface 3 of the connection part 2. A metallic sealing coupling between the contact surfaces of the connection part 2 and the clamping ring 7 is achieved through this pressure. No separate sealing elements are required. The axial forces resulting when the union nut is threaded on are received by the connection part 2 via the outer thread 4. The thin clamping region 11 is also constricted when the union nut 6 is threaded on. The pipe 1 is prevented by this constriction from slipping off due to internal pressure and/or pressure shocks. The V groove 13 on the clamping ring 7 imparts an improved elasticity to this ring in order to enable absorbing pressure shocks and vibrations.

Figure 2:
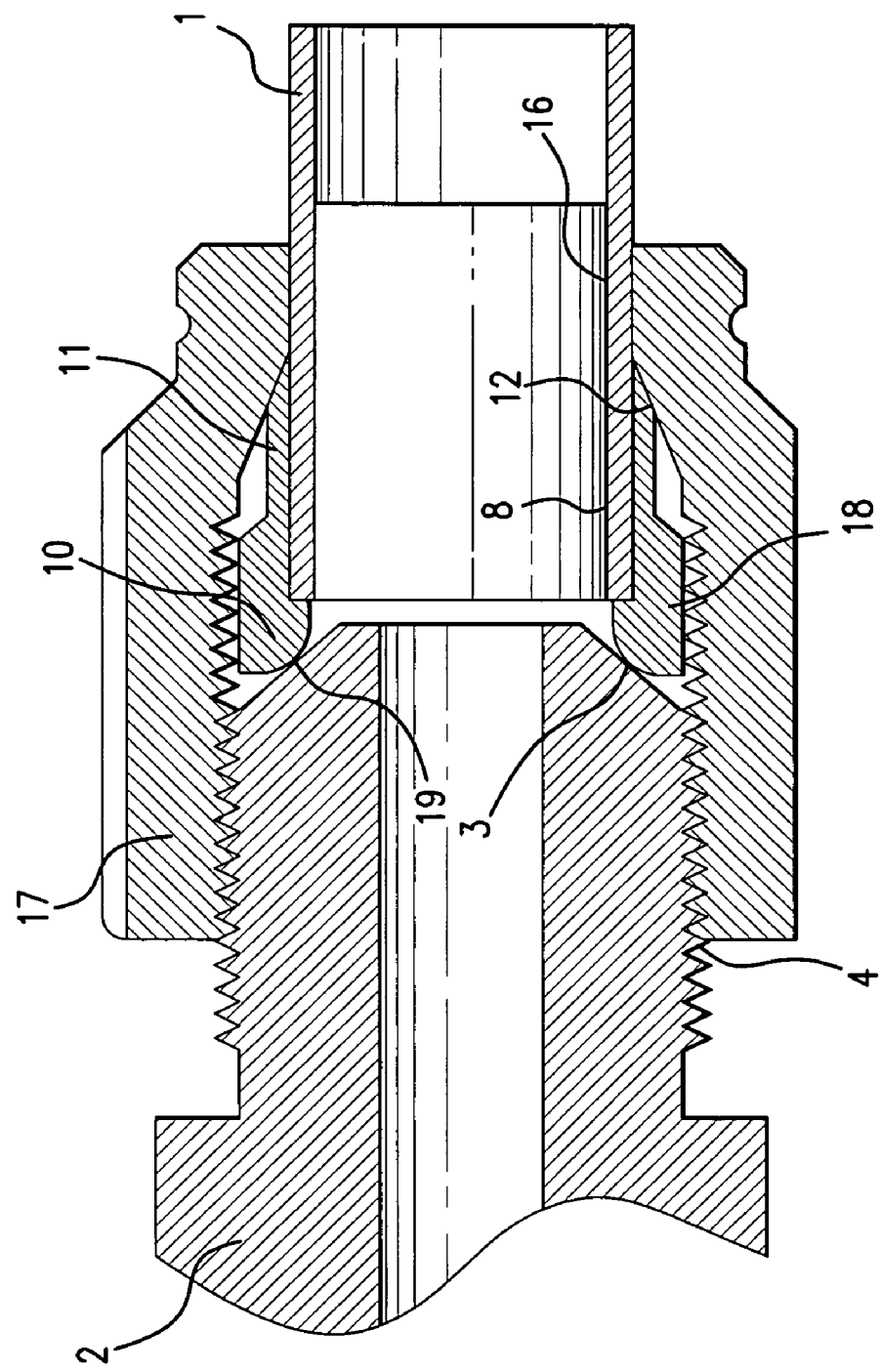

FIG. 2 shows a second embodiment of a threaded pipe coupling for connecting a pipe 1 to a connection part 2 configured in the shape of a connection nipple with a front conical exterior surface 3. For this configuration, the connection part 2 includes an external thread 4 onto which a sleeve-shaped union nut 17 provided with a corresponding internal thread 5 is threaded. This union nut 17 distinguishes itself from the union nut 6 of the first embodiment in that it does not have the additional shoulder in the vicinity of the V-shaped groove 13 of the clamping ring 7 for the union nut 6 of FIG. 1. Therefore, the clamping ring 18 used for the second embodiment is less beveled or angled for assembly. The union nut 17 has only a conical contact surface 19 running at 45° angle for the clamping ring 18. Therefore, an optimal surface pressure is enabled for the mechanical contact between the union nut 17 and the clamping ring 18.

The clamping ring 18 includes a thick contact region 10 projecting in the axial direction beyond the pipe end and a thin clamping region 11 which is arranged over the pipe end and which contacts on its outer side a conical inner surface 12 of the union nut 17. The clamping ring 18 also includes an inner reception opening 8 matched to the diameter of the pipe 1 with a contact surface 9 for receiving the pipe end. A support sleeve 16 for stabilization can also be inserted into this pipe end. The union nut 17 also includes a conical inner surface 12, by means of which the clamping region 11 of the clamping ring 18 is pressed inwards when the union nut 17 is threaded on. Because these features are also present in the first embodiment, the corresponding reference numbers were also used.

However, in contrast to the clamping ring 6, the clamping ring 18 does not have on its end pointing towards the connection part a conical inner surface with a raised sealing bead, but instead has a convex contact surface 19 for contact with the conical outer side of the connection part. This provides a reduction of the starting torque and improved adaptation of the clamping ring to different configurations of the connection part. In addition, a more robust construction of the threaded coupling can be achieved. On its outer side the clamping ring 18 still includes only a step and has no V groove in the outer periphery, which increases the strength of the clamping ring and further improves the pressure resistance of the threaded coupling.

For this configuration of the threaded pipe coupling, the clamping ring 18 is also pressed against the front conical exterior surface 3 of the connection part 2 when the union nut 17 is threaded on. This pressure creates a metallic sealing coupling between the contact surfaces of the connection part 2 and the clamping ring 18. Here also, no separate sealing elements are required.

What is claimed is:

1. A threaded pipe coupling having an axis and opposed axial ends, especially for connecting a copper pipe in refrigeration technology to a connection part that is characterized with an external and internal diameter, an external threading and a conical exterior end surface, consisting of:
   (a) an axially extending metal clamping ring having a first axial end for contacting the conical exterior end surface of the connection part and a second axial end for receiving the copper pipe to be connected;
   (b) the metal clamping ring defining a first interior surface having a diameter positionable about an outer diameter of the copper pipe to be connected extending from the second axial end, and a second interior surface, of lesser diameter to the first interior surface extending from the first axial end of the metal clamping ring, and a first step defined by the metal clamping ring where the first and second interior surfaces meet so that the end of the copper pipe to be connected can be received into the second axial end, and contact directly and bear directly against said first step;
   (c) the metal clamping ring defining a first exterior surface having a first diameter positionable in the connection part extending from the first axial end of the metal clamping ring to a point axially between the first step defined by the metal clamping ring and the second axial end of the metal clamping ring, and a second exterior surface of lesser diameter than that of the first exterior surface of the metal clamping ring extending from the second axial end to meet the first exterior surface, and a second step defined by the metal clamping ring where the two exterior surfaces meet;
   (d) the first axial end of the clamping ring terminating in a convex surface that extends from the second interior surface radially outwardly toward the first exterior surface so that the convex surface will contact tangentially and directly and bear directly against the conical exterior surface of the connection part when effecting the connection; and
   (e) a sleeve-shaped union nut having first and second ends, said first end having an interior diameter positionable over the copper pipe when effecting a connection;
   (f) a radially increasing interior inclined surface defined by the sleeve-shaped union nut in its interior surface adjacent the first end of the sleeve-shaped union nut for contacting directly and bearing directly against the second axial end of the metal clamping ring when effecting a connection;
   (g) the second end of the sleeve-shaped union nut being threaded internally and being a suitable interior diameter to coact with the external threading on the connection part when effecting a connection;
   whereby when the sleeve-shaped union nut is positionable on a the copper pipe to be connected, the copper pipe is received in the metal clamping ring and bears against the first step, and the sleeve-shaped union nut is threaded onto the connection part and tightened, whereupon the convex surface at the first axial end of the metal clamping ring is brought to bear directly and tangentially against the conical exterior end surface of the connection part so that the starting torque for tightening is substantially reduced, and when tightened a sealing is effected without the necessity for any further elements.

2. A threaded pipe coupling having an axis and opposed axial ends, especially for connecting a copper pipe in refrigeration technology to a connection part that is characterized with an external and internal diameter, an external threading and a conical exterior end surface, consisting of:
   (a) a copper pipe;
   (b) a connection part; and
   (c) an assembly for connecting the copper pipe to the connection part, and including,
      (i) an axially extending metal clamping ring having a first axial end for contacting the conical exterior end surface of the connection part and a second axial end for receiving the copper pipe to be connected,
      (ii) the metal clamping ring defining a first interior surface of a diameter substantially equal to an outer diameter of the copper pipe to be connected extending from the second axial end, and a second interior surface, of greater diameter than the internal diameter of the connection part, but of lesser diameter to the first interior surface extending from the first axial end of the metal clamping ring, and a first step defined by the metal clamping ring where the first and second interior surfaces meet so that the end of the copper pipe to be connected can be received into the second axial end, and contact directly and bear directly against said first step, (iii) the metal clamping ring defining a first exterior surface of a first diameter lesser than an external diameter of the connection part extending from the first axial end of the metal clamping ring to a point axially between the first step defined by the metal clamping ring and the second axial end of the metal clamping ring, and a second exterior surface of lesser diameter than that of the first exterior surface of the metal clamping ring extending from the second axial end to meet the first exterior surface, and a second step defined by the metal clamping ring where the two exterior surfaces meet, (iv) the first axial end of the clamping ring terminating in a convex surface that extends from the second interior surface radially outwardly toward the first exterior surface so that the convex surface will contact tangentially and directly and bear directly against the conical exterior surface of the connection part when effecting the connection;

(v) a sleeve-shaped union nut having first and second ends, said first end having an interior diameter substantially equal to the diameter of the copper pipe to be connected so that it will fit over the copper pipe when effecting a connection, (vi) a radially increasing interior inclined surface defined by the sleeve-shaped union nut in its interior surface adjacent the first end of the sleeve-shaped union nut for contacting directly and bearing directly against the second axial end of the metal clamping ring when effecting a connection, and (vii) the second end of the sleeve-shaped union nut being threaded internally and being a suitable interior diameter to coact with the external threading on the connection part when effecting a connection;

whereby when the sleeve-shaped union nut is placed on the copper pipe to be connected, the copper pipe is received in the metal clamping ring and bears against the first step, and the sleeve-shaped union nut is threaded onto the connection part and tightened, whereupon the convex surface at the first axial end of the metal clamping ring is brought to bear directly and tangentially against the conical exterior end surface of the connection part so that the starting torque for tightening is substantially reduced, and when tightened a sealing is effected without the necessity for any further elements.

* * * * *